Figure 6:
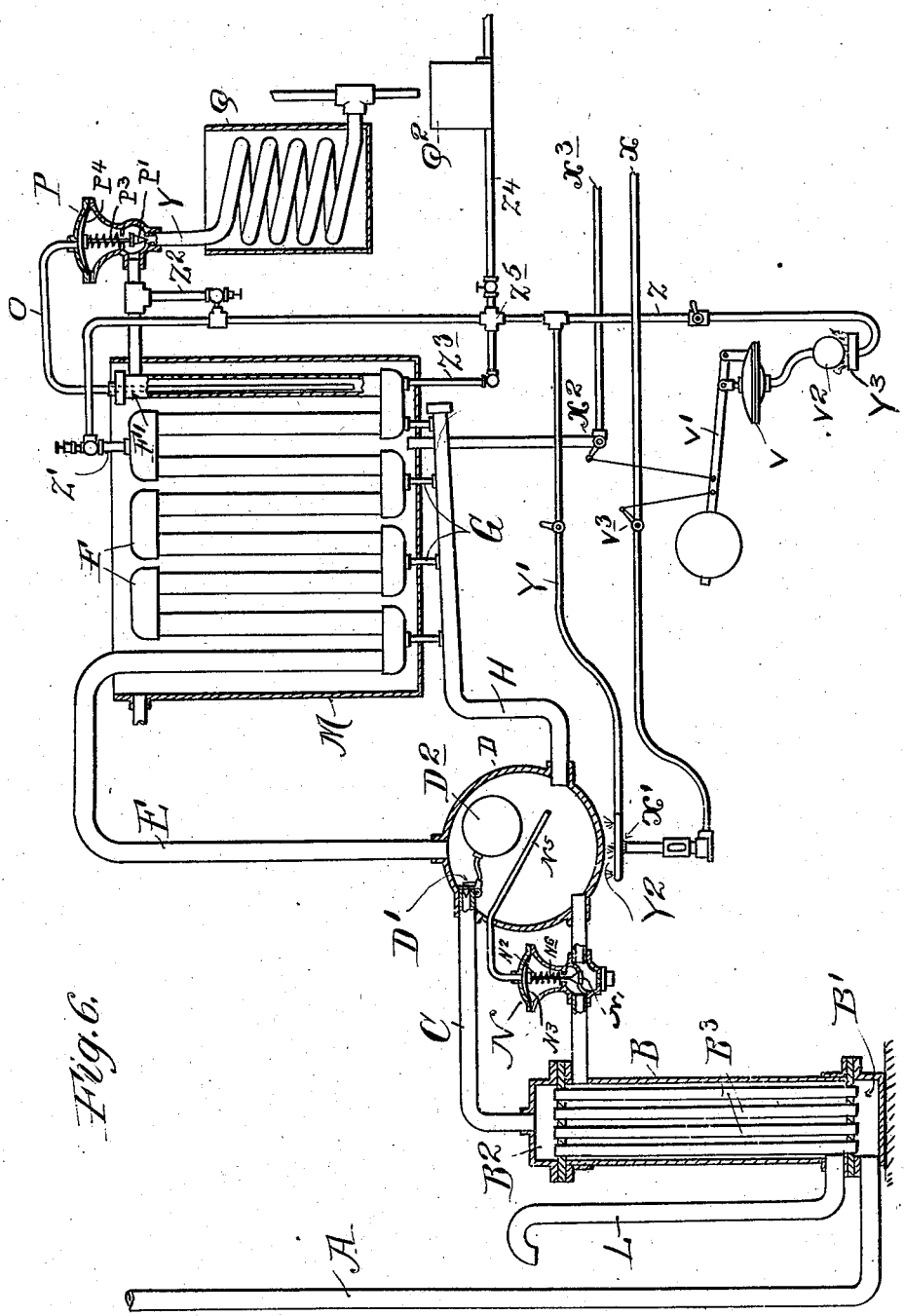

A. G. WATERHOUSE.
ART OF DISTILLING ALCOHOLS AND OTHER VOLATILE LIQUIDS.
APPLICATION FILED AUG. 24, 1908.
939,361. Patented Nov. 9, 1909.
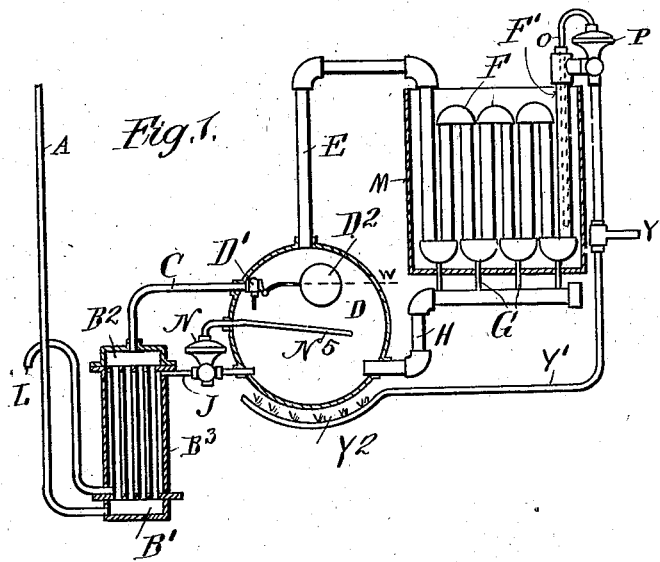
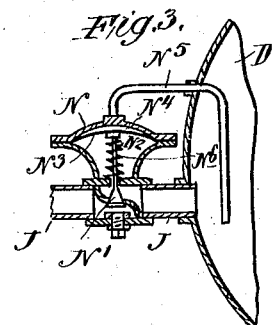
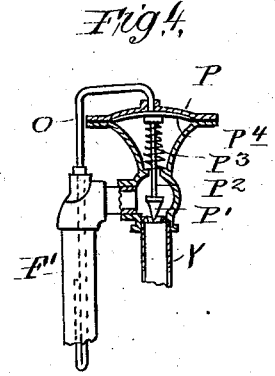
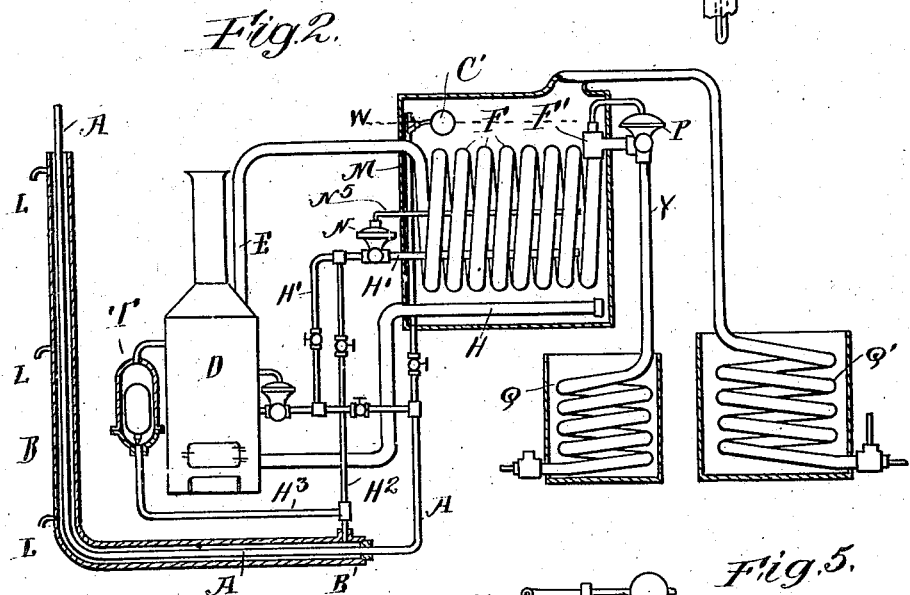
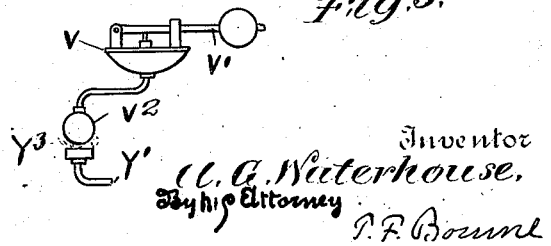

A. G. WATERHOUSE.
ART OF DISTILLING ALCOHOLS AND OTHER VOLATILE LIQUIDS.
APPLICATION FILED AUG. 24, 1908.

939,361.

Patented Nov. 9, 1909.
2 SHEETS—SHEET 2.

Witnesses:

Inventor
A. G. Waterhouse
By his Attorney
T. F. Bourne

UNITED STATES PATENT OFFICE.

ADDISON G. WATERHOUSE, OF GOOD GROUND, NEW YORK.

ART OF DISTILLING ALCOHOLS AND OTHER VOLATILE LIQUIDS.

939,361. Specification of Letters Patent. Patented Nov. 9, 1909.

Application filed August 24, 1908. Serial No. 449,995.

*To all whom it may concern:*

Be it known that I, ADDISON G. WATERHOUSE, a citizen of the United States, residing at Good Ground, Long Island, in the county of Suffolk and State of New York, have invented new and useful Improvements Relating to the Art of Distilling Alcohols and Other Volatile Liquids from Water, of which the following is a specification.

My invention relates to those methods of distilling alcohol, wherein either the single or double effect of heat is employed for driving both steam and alcoholic vapors from the liquid to be treated, and then separating the steam from the vapor; or by the application of a limited degree of heat, driving the vapor of alcohol from the liquid without generating steam therefrom.

The object of the invention is to conserve the heat required for distilling, whereby large volumes of liquid containing a small percentage of alcohol can be economically employed, my invention being equally applicable to liquids more rich in alcoholic properties.

My invention contemplates utilizing the heat of the liquid from which the alcohol has been extracted for heating the liquid from which the alcohol is to be secured; and also in employing the combustible or non-combustible nature of vapors or gases, for automatically effecting the proper separation of the same.

In order to describe my invention so that those versed in the art may utilize the same, reference will be had to the accompanying drawings, in which like characters indicate like parts, and in which;

Figure 1 shows, diagrammatically, a distilling apparatus by which my invention may be carried out; Fig. 2 shows an apparatus employing the double effect of heat; Figs. 3, 4 and 5 are details, and Fig. 6 illustrates the application of the device shown in Fig. 5.

Fig. 1 shows an apparatus comprising a boiler D, a heat exchange B, a condensing tank M, and a vapor separator P.

The boiler D is a closed vessel, under which fire, represented by the flame $Y^2$, can be applied, and into which liquid can be automatically admitted so that its surface will be maintained at some fixed level, represented by the dotted line W, whereby a space will be left within the boiler for the accumulation and escape of vapor and steam. Such liquid level is maintained by means of the float $D^2$, which controls the inlet valve D'. While the temperature of the liquid is raised and remains at a substantially predetermined degree, said liquid is automatically allowed to flow from the boiler, and thereby lower the level W, causing fresh liquid to flow in; but such flow is regulated to accord with the effect of the heat applied to the liquid, and such flow is made dependent upon such heat being maintained at substantially a fixed temperature. This is effected by the thermal valve N, of which an enlarged sectional view is shown in Fig. 3, consisting of a valve N', having a stem $N^2$, connected to a flexible diaphragm $N^3$, above which is a closed space $N^4$, from which extends a tube or feeler $N^5$, into the boiler D. This valve N is kept normally closed by the spring $N^6$, and is piped to the boiler D. Said feeler $N^5$ is filled with alcohol or other volatile fluid, from which vapor will be generated, as the heat, when up to a predetermined temperature, is transmitted to it from the liquid in the boiler D, and the vapor in the feeler will then exert a pressure upon the diaphragm $N^3$, in a way adapted for opening the valve N', only so long as the required temperature in the boiler is maintained, and during which time the liquid can flow in and out of the boiler at a rate corresponding to the heat maintained in the boiler.

The heat exchange shown comprises a vessel consisting of an outer shell B, having separate chambers B' and $B^2$, connected by tubes $B^3$, through which the supply liquid enters, through pipe A, and passes upward through tubes $B^3$ on the way to boiler D through pipe C and valve D', while the liquid which flows from boiler D enters shell B through pipe J from valve N, and then flows inside of shell B and outside of tubes $B^3$, thereby bringing the cold inflowing liquid in thermal contact with the hot outflowing liquid, so that the same heat is returned and used over and over again, or so that the cold liquid enters the boiler hot, and the hot liquid from the boiler leaves the heat exchange through the discharge pipe L in a relatively cold state.

The vapor separator shown consists of a tank M in which condensing pipes F are submerged in cooling liquid, maintained at a temperature adapted for condensing the steam of water, but not the vapor of alcohol. Both the vapor and steam from the boiler D flow through pipe E to the condensing pipes F, from which the water of condensation from the steam flows by gravitation down through the drain tubes G, to the return pipe H, and back to the boiler, while the vapor of alcohol and other gases continues through succeeding reaches of the pipe F, until such vapor passes out through the separator valve P, and then through pipe Y to where the alcoholic vapors are condensed, while some part of such vapor or gases is or may be led to the fire through pipe Y', for supplying or subduing the heat of the flame Y².

The separating valve P, shown in section in Fig. 4, comprises a valve P' provided with a stem P², and a spring P³ adapted for keeping the valve open; above the valve stem P² is a flexible diaphragm P⁴, capable of being made to press upon the stem and close the valve against the resistance of the spring P³; above the diaphragm is a closed space (the same as in Fig. 3) from which a closed tube or feeler O extends into the pipe F', leading from condensing pipes F to the valve P. Said feeler tube O is filled with alcohol or other volatile fluid capable of being turned into vapor under pressure by the heat of the steam when it reaches said feeler, so that if the steam in said pipe is not properly condensed before it reaches the feeler O, then the fluid in feeler O will immediately be evaporated to an extent which will create a pressure upon the diaphragm P⁴, and either close or partially close valve P', and thus modify the pressure within the still so that the steam will have time to condense or will condense more or less rapidly, and leave the alcoholic vapors and gases a free passage through the valve, which will normally remain open for them.

The flame Y² may furnish all or any part of the heat required for the apparatus, and each operation of the same can be made dependent upon the heat furnished by this flame, and this heat in turn may be made dependent upon the nature of properties of the vapors or gases which may be led to it from any part of the apparatus either for feeding or checking the flame, that its heat will be tempered to effect the conditions required for properly separating the alcohol from its liquid, by furnishing the flame with such vapor and gases as are adapted for maintaining the heat required, as shown by Fig. 1. Thus, if the flame Y² burned too hot when pure alcohol or its vapor was led to it, then the still might or would be rushed, so that the steam, not having time to condense, would advance and mingle with the vapor which supported the flame and thereby check its heat, and, in turn, slow or retard the action of the still until the steam had time to condense and allow such vapors to pass to the flame as would maintain the modified heat required. To this end a diaphragm regulator V may be employed which works the weighted lever V', shown in Fig. 5, and as more fully represented in Fig. 6, where the regulator is shown in connection with the apparatus, which is substantially as shown in Fig. 1, with the addition of pipes, valves and details required for illustrating the relation of the regulator V to the still, wherein the fresh and exhausted liquid pass to and from boiler D through heat exchange B, subject to the thermal condition of the fluid in the boiler. The vapor of alcohol and accompanying steam is conducted through pipe E, and the pipes F submerged in cooling liquid contained in the tank M, which pipes E and F and tank M may represent any form of condensing column or device adapted for separating the steam or vapors of water from those of alcohol and returning the water back to the boiler, while that of the alcohol continues through pipes F and the separator valve P to a final condenser Q where its liquid alcohol is delivered in a receiver Q² in manner before explained.

Leading from different parts or steps in the apparatus are four pipes with valves, represented by Z', Z², Z³, Z⁴, leading to a common junction or cross Z⁵, through which vapor or liquid can be drawn as they have been subjected to different degrees of distillation, which will determine their combustible, partially combustible or non-combustible nature, and thereby indicate the action of the still. Either of these vapors or fluids can be led from junction Z⁵, through pipe Y' to the burner, where they will produce the more or less heat at flame Y² required for properly operating the still as before described; or, instead of using pipe Y', said vapors or fluids can be conducted through pipe Z to supply the flame Y³ for heating more or less the volatile fluid in the bulb V², for causing a corresponding pressure on the diaphragm of the pressure regulator V to operate its weighted lever V'. Now, the motion of lever V' will correspond with the heating effect of the flame Y³, and this motion can be used to operate the valves V³, and V⁴, either or both of them, by suitable connection with lever V', and valve V³ can be used to regulate the flow of gas from any source through pipe X, to flame X', or control the flow of steam through a heating pipe leading to boiler D, or do any other work adapted for controlling the heat applied to the boiler, such as working dampers of a furnace used for that purpose. Or, the lever V' may be used for working valve X² used for regulating the supply of cooling liquid led through pipe X³ to tank M for maintaining the proper temperature therein, or for doing any other regulating work for controlling the heat, the flow of material within the still, or that used for effecting the condensation required for automatically governing the action of the same.

It will be understood that my invention is not confined to the use of the above named vapors and gases for creating heat for operating the still, as heat may be applied to the still in any well known manner independently of or in conjunction with said vapors and gases.

It will be seen in Figs. 3 and 4 that the vapor or liquid passing through their respective valves N' and P' will exert an upward or outward pressure upon their diaphragms, which pressure would tend to either open or close the valves, and interfere with their action, were it not for the counteracting pressure exerted upon the diaphragms by the vapor from their feeler tubes N⁵ and O, which pressure accords with the heat which must correspond with any pressure that the liquids or vapors may exert while passing through the valves, and thereby cause these valves to work correctly through all degrees of heat and pressure to which they may be subjected.

Fig. 2 shows an apparatus similar to Fig. 1, but adapted for using the second effect of heat, and in which D is a boiler wherein steam and vapors are evolved by heat, and conducted through pipe E to the condensing pipes F, wherein the steam is condensed and returned to the boiler through pipe H, while the vapor of alcohol in pipes F passes through the separating valve P and is then condensed in the cooler Q in manner before described. In this case the tank M is used as an evaporator for alcohol, formed as a closed vessel, into which liquid from which alcohol is to be secured is admitted by means of the float actuated valve C', up to the level represented by dotted line W, and then allowed to escape by the thermal valve N, after it has been heated by the steam in pipes F from boiler D up to a temperature adapted for driving alcoholic vapors from the liquid and not generating free steam therefrom. When the liquid leaves evaporator M it can be conducted through pipe H' to the boiler D or through pipe H² to the heat exchange B, where it meets the liquid from boiler D, which is allowed to flow therefrom through pipe H³, (after it reaches a certain level in the boiler), by means of the steam trap T, which allows the passage of liquid to the exclusion of steam or vapor. In this way, by means of the valves shown, the liquid can be made to enter and leave the boiler and evaporator M in multiple, or be caused to flow through both in series, and so that in either case it will pass through the heat exchange B, in a way which will cause the hot outflowing liquid to transfer its heat to the cold inflowing liquid which enters through the supply pipe A.

As diagrammatical forms have been chosen for ease of illustration, it is understood that full advantage can be taken of the state of the art in determining the practical forms which may be adopted in the construction of the apparatus utilized for carrying out my invention.

By the word "steam" in this application I mean aqueous or other vapor not desired as a product of distillation.

Having now described my invention what I claim is:—

1. The method of distilling consisting in heating liquid to a degree sufficient to cause vaporization of substantially all the alcohol in the liquid, maintaining the temperature of the liquid approximately at the temperature required for such vaporization and controlling the flow of the liquid by the temperature of the liquid being distilled.

2. The method of distilling consisting in heating a body of liquid to a degree sufficient to cause partial vaporization thereof, causing such liquid to flow by use of the temperature in the still, substantially at a predetermined degree, and maintaining the level of liquid in the still by a flow of liquid proportioned to the amount of the first named flow.

3. The method of distilling consisting in causing liquid in transit to absorb heat from juxtaposed hot liquid in transit, raising the temperature of such heated liquid to a degree sufficient to cause vaporization of the alcohol thereof, and causing the heat that effects the vaporization of the alcohol to control the flow of said juxtaposed liquid.

4. The method of distilling consisting in transmitting the heat from one current of liquid to another circulating from and to a heated body of liquid, causing partial vaporization of such body of liquid, and causing said circulation of liquid by the temperature of such body of liquid.

5. The method of distilling consisting in causing cold supply liquid to absorb the heat from juxtaposed hot discharge liquid while both are in transit and distilling such liquid and controlling the flow of such supply and discharged liquid by raising the temperature of the liquid just sufficient to effect the generation of the alcoholic vapor therefrom.

6. The method of separating combined liquids having different boiling points consisting in heating the liquid to a degree sufficient to cause partial vaporization of the liquid, causing the residual liquid to flow in accordance with the temperature required for such vaporization, and using a portion of the product of distillation to effect vaporization of the liquid.

7. The method of separating liquids having different boiling points consisting in heating the liquid to a degree sufficient to cause partial vaporization of the liquid, causing the remaining liquid to flow in accordance with the temperature required for such vaporization, using a portion of the product of distillation for producing heat used in distilling such liquid and causing vapor of distillation to modify such heat.

8. The method of separating liquids having different boiling points consisting in heating the liquid to a degree sufficient to cause partial vaporization of the liquid, causing the residual liquid to flow in accordance with the temperature required for such vaporization, using a portion of the product of distillation for producing heat used in distilling such liquid and causing other vapor of distillation to flow with such heating vapor to modify the heat produced by the last named vapor.

9. The method of separating liquids having different boiling points consisting in heating a body of liquid to a point below the temperature required for vaporizing an undesired part thereof and simultaneously vaporizing a desired part thereof, first condensing any such undesired vapor that may be carried over with the desired vapor, employing a portion of the desired vapor in effecting the distillation of such liquid, and causing a portion of such undesired vapor carried with the desired vapor to modify such effect.

10. The method of separating liquids having different boiling points consisting in applying heat to a body of liquid and vaporizing the same, condensing out of such vapor a non-combustible part thereof at a temperature above the condensation point of a combustible part of said vapor, burning a portion of the combustible vapor in proximity to said body of liquid to apply heat thereto, and causing a portion of the said non-combustible vapor to modify the heat of said burning vapor.

11. The method of fractional condensation consisting in causing heat of steam, as distinguished from heat of commingled steam and vapor of more volatile liquid, to regulate the pressure under which said steam is condensed out of a mixture of steam and more volatile vapor without condensing said more volatile vapor.

12. The method of distilling consisting in causing liquid in transit to absorb heat from juxtaposed liquid in transit, raising the temperature of such heated liquid to a degree sufficient to cause partial vaporization of said liquid, and causing the circulation of the liquid to depend upon the resultant temperature due to the heat applied and carried off by such vaporization.

13. The method of distilling consisting in heating liquid to cause partial vaporization thereof, and burning part of the product to cause such partial vaporization and to control the circulation of the liquid through the still.

ADDISON G. WATERHOUSE.

Witnesses:
HOWARD T. MESCHUTT,
GEORGE J. CAFFREY.